United States Patent
Hong et al.

(10) Patent No.: US 9,323,587 B2
(45) Date of Patent: Apr. 26, 2016

(54) METHOD AND SYSTEM FOR AUTOMATIC DETECTING AND RESOLVING APIS

(71) Applicant: National Taiwan University, Taipei (TW)

(72) Inventors: Zhen-Chao Hong, Taipei (TW); Yuh-Jzer Joung, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 793 days.

(21) Appl. No.: 13/628,189

(22) Filed: Sep. 27, 2012

(65) Prior Publication Data

US 2014/0089383 A1    Mar. 27, 2014

(51) Int. Cl.
*G06F 15/16* (2006.01)
*G06F 9/54* (2006.01)
*H04L 29/08* (2006.01)

(52) U.S. Cl.
CPC *G06F 9/54* (2013.01); *H04L 67/16* (2013.01); *G06F 2209/541* (2013.01)

(58) Field of Classification Search
None
See application file for complete search history.

(56) References Cited

U.S. PATENT DOCUMENTS

| 5,864,669 A * | 1/1999 | Osterman et al. ............. 709/203 |
| 2008/0188963 A1* | 8/2008 | McCoy ............................ 700/90 |
| 2012/0296929 A1* | 11/2012 | Hossain ............ G06F 17/30864 707/769 |
| 2013/0124608 A1* | 5/2013 | Gregorio et al. .............. 709/203 |
| 2014/0068639 A1* | 3/2014 | Schrock et al. ............... 719/328 |

* cited by examiner

*Primary Examiner* — John B Walsh
(74) *Attorney, Agent, or Firm* — Bacon & Thomas, PLLC

(57) ABSTRACT

The present invention provides a mechanism for detecting and resolving Application Programming Interfaces (APIs) comprising: requesting a server device by a client device for the APIs supported by the server; and responding by the server with a list containing the identifiers of the APIs supported by the server, wherein each of the identifiers contains the network address from which the corresponding API definition document can be obtained. The proposed mechanism provides a systematic way to establish the consensus on API definitions between a client and a server even if the client, the server, and the API definitions are each developed by a different party. Therefore, this invention allows independently developed devices to be easily integrated into a system, in which a client device can automatically and correctly determine the APIs for communicating with a server device at runtime.

15 Claims, 5 Drawing Sheets

METHOD AND SYSTEM FOR AUTOMATIC DETECTING AND RESOLVING APIS

BACKGROUND OF THE INVENTION

1. Field of the Invention

The present invention relates to application programming interfaces (APIs), and more particularly, to detect and to resolve APIs in a distributed system.

2. Description of the Prior Art

A distributed system is a network of electronic devices interconnecting with each other through the use of a network. The devices typically include computers ranging from personal laptops to large mainframes, but may also include other forms of computing devices such as mobile phones and home entertainment devices. A server device in the system provides services to other devices in the network by accepting request messages sent from a client device over the network, and performs actions according to the request message. For example, a network printer may print out a document upon receiving a printing request, a network camera may pan to the left upon receiving a panning request, and a database server may return a list of sales records upon receiving a sales report request. To trigger such actions on a server, a client device needs to know what actions are available on the server, as well as the messages needed to trigger the actions. More specifically, a client device needs to understand the application programming interfaces (APIs) of the server. With the knowledge of the server's APIs, the client device may trigger actions on the server by using corresponding methods described in the APIs.

If a client device intends to communicate with a particular server which is known when the client device is being developed, the knowledge of the server and its APIs can be built into the client device directly. For example, a client device may be built to obtain map information from a particular web-based map server to display restaurant locations on a map. Since the web-based map server is chosen at development time, the information such as the web server's access URL and its APIs can be compiled into the client device's program.

In many applications, however, the server's information is unavailable while a client device is being developed. For example, different company's networks may have different printer servers, network cameras, or database servers. The information about these servers is available only when a client device is participating in the network at runtime, but not at development time. Historically, to build a client device to communicate with such servers, the program in the client is built to work with a particular set of APIs, and the client uses an API detection mechanism to interrogate whether a given server supports the APIs at runtime. Since a client device may encounter many different servers in different networks, it is often preferred that the API detection mechanism can be applied to a wide range of servers. This is increasingly important with advances in the Internet and in mobility technologies, in that a client device has the potential to communicate with any server in the world.

Unfortunately, at present, API detection mechanisms can only be applied to a very limited set of servers that are closely related to the client device during their development phase, and may even produce faulty results when applying to other servers. This is because most API detection mechanisms require some server specific information in the client device. Such information is not available at runtime and therefore must be built into the client device beforehand.

For example, with the current API detection mechanism, a server may present its APIs to a client by giving the client a list of API names, such as CORBA interface IDs or Java interface class names. The client then compares the names with the API names that the client recognizes. However, the API definition that each name represents is available only at development time, and the API definition information is compiled into both the client's and the server's programs; such information is not obtainable through the detection mechanism at runtime. A foreign client device that does not have the same API definition information will not be able to know what the API names on the server represent. Worse yet, the foreign client device may have a different API definition that happens to be assigned with the same name used by the server, a situation commonly known as API naming collision. Consequently, the foreign client device will mistakenly assume that the server supports the API definition known by the foreign client, whereas the server actually supports a different API definition. That is, the client and the server do not have the consensus on the definition of the API identified by the name.

For another example, with the current API detection mechanism, a server may provide the full definition of its APIs to a client, such as a list of function names that can be called remotely. This method does not eliminate the need of having server specific information in the client device, in that the client must know the intended use of the functions on the particular server. A function named 'draw' on one server may produce graphic outputs, whereas a function named 'draw' on another server may end a chess game in a tie. Accordingly, knowing that the API definition obtained from a foreign server contains a function named 'draw' is not enough for a client device to perform graphic actions on a server, whereas blindly calling the function on the foreign server may lead to unintended results. This problem is also caused by the lack of consensus on the API definition due to API naming collision.

The aforementioned problems make current API detection mechanisms difficult to apply in detecting a web server's APIs. The large number of web application servers in the Internet dramatically increases the possibility of API naming collision, whereas reaching the consensus on API definitions among different web servers is difficult since each web server may be operated by a different party. Without the consensus on API definitions, a client cannot reliably detect a foreign web application server's API at runtime and correctly communicate with the server thereafter.

Therefore what is required is a mechanism that allows a client device to automatically resolve the APIs of a server in such way that the consensus of API definitions can be established between the client and the server even if the client, the server, and the API definitions are each developed by a different party.

SUMMARY OF THE INVENTION

This invention relates to a method and system that allows a client electronic device to automatically determine whether a server electronic device can be communicated in accordance with certain API definition using the information obtainable at runtime. This is achieved by requesting a server device for the APIs it supports from a client device, and the server device responding with information containing a list of API identifiers, wherein each identifier contains the network address where the corresponding API definition document is reposited. The client device then associates the API identifiers with the API that the client understands to resolve available APIs for communicating with the server. Here, "the client understands the API" means that the client supports the API and can communicate with a device in accordance with the API.

The essence of this invention is to use the network address from which an API definition document can be fetched as an API identifier to assist the API detection and resolving process. Using such identifier is superior than using an arbitrary name, in that the identifier establishes the consensus on the API definition among clients and servers referencing the API with the identifier, since all devices are able to fetch the same copy of the API definition from the identified network address. Different APIs are reposited at different network addresses. Hence the use of such API identifiers is not subject to API naming collision. The API identifier also establishes the authority of the API definition, because only the party that controls the device providing the API definition document at the identified network address can make changes to the API definition. Accordingly, different servers will not be able to provide inconsistent definition documents to the same API identifier using this method, thereby establishing the consensus on the API definition corresponding to the API identifier among devices.

In this invention, one API can be extended from a list of original APIs to add extra communication actions to the original APIs; the API with the extra actions is called an extended API, whereas the original APIs are called the parent APIs of the extended API. The definition document of an extended API contains the definitions of the extra communication actions, along with a list of network addresses, each of which is the API identifier of a parent API. A server supporting an extended API can be communicated with the extra actions, as well as all the actions defined in the extended API's parent APIs.

By listing the API identifiers of the parent APIs in an extended API's definition document, this invention further allows a client electronic device to automatically resolve its API compatibility with a server electronic device even in the event that a server's API identifier is not directly recognized by the client. A client can investigate an unrecognized API identifier by recursively tracing the definition document corresponding to the unrecognized API identifier. The recursive tracing procedure is as follows: the client fetches the API definition from the network address pointed to by the unrecognized identifier. If the definition contains a list of parent API identifiers that the API in question is extended from, and client recognizes any of the parent API identifiers, the client can communicate with the server through the recognized parent API. If the client device does not recognize the parent API identifiers in the list either, the client may further fetch their API definitions, which may contain even more parent API identifiers to be investigated. This recursive procedure goes on until the client recognizes a parent API identifier, or all obtained parent API identifiers are investigated. Note that the APIs corresponding to all parent API identifiers obtainable through the recursive tracing procedure are all called the parent APIs of an extended API.

This invention also includes a method and system that allows a client electronic device to automatically discover a server electronic device that supports a particular API in a network. In the event that a client device seeks a server device that supports a particular API, the client device sends a broadcast message containing the aforementioned API identifier of the API to all devices in the network. A server receiving the message will determine the compatibility between the requested API and the server's APIs, and will report the server's network address to the client if the server determines that they are compatible.

DETAILED DESCRIPTION OF THE PREFERRED EMBODIMENTS

The detailed embodiments accompanied with the drawings will illustrate the present invention. It is to be noted that the embodiments of the present invention are exemplary and the present invention is not limited to the embodiments. The embodiments provided make the disclosure of this invention full and clear; therefore, those skilled in the related art can make and use this invention.

In this invention, the client electronic devices and the server electronic devices are devices with computing power and connecting to networks, such as personal computers, mainframe computers, mobile phones, home entertainment devices, or embedded devices with computing and networking capabilities. Whether a device is a client device or a server device depends on the device's role in a particular operation; a device making a request is called a client device, whereas a device responding to the request is called a server device. One device can be a client device in one operation, but becomes a server device in another operation. For example, a network printer is a server device when responding to printing requests, whereas the same printer becomes a client device when requesting date and time information from a network time server.

Figure 1:
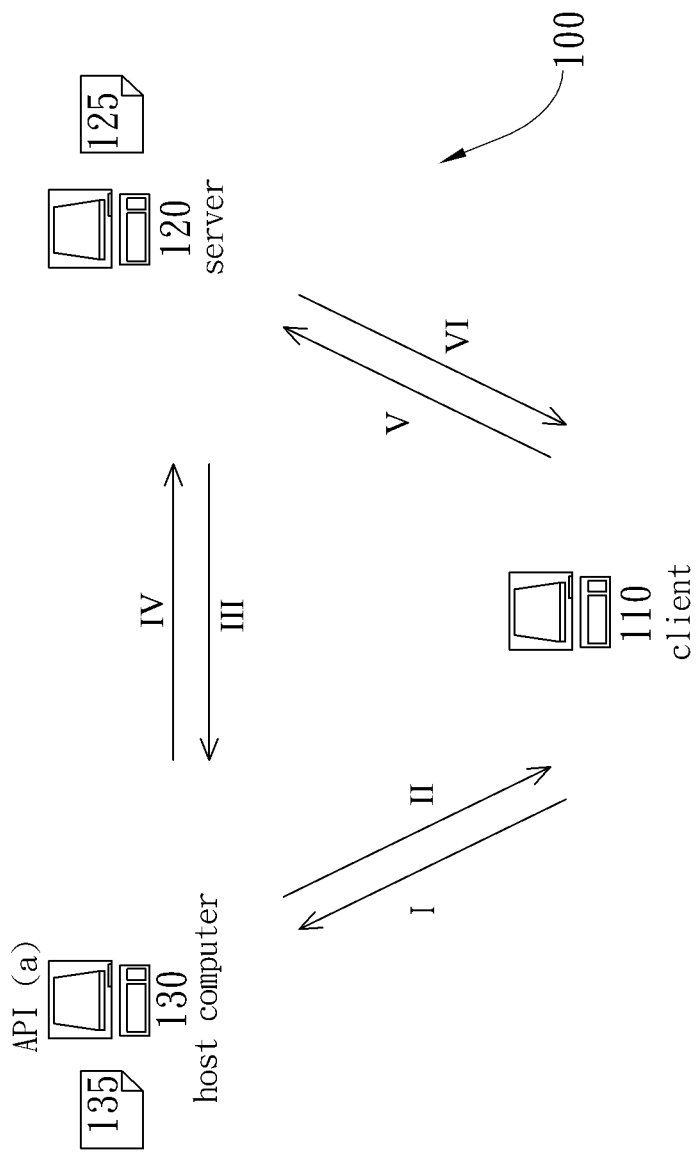
FIG. 1 shows a distributed system wherein the client determines the support of an API on the server in accordance with the first embodiment of the invention.

FIG. 1 illustrates the first embodiment of this invention. In a distributed system 100, a client electronic device 110 intends to communicate with a server electronic device 120, using methods described in the application programming interface definition document 135. The document 135 describes an API's definition in a machine processable format, such as industry standard formats XML or JSON. The API definition document 135 details the communication actions that may apply to a server supporting the API, such as a list of function names with their respective input and output data types that may be called on the server, a list of properties that may be read from or write to the server, and a list of special data type definitions that may be used in the communication, and so on.

The API definition document 135 is reposited in a host computer 130 in the distributed system 100, and (a) is the network address from which document 135 can be fetched in the system 100. Many standard technologies allow the computer 130 to provide the document 135 over the network. For example, computer 130 may have a web server running on it, and provides the document 135 over HTTP upon request. In such case, (a) is the HTTP URL address where the document 135 may be obtained from the web server. Here, (a) is also used as the API identifier that represents the API definition described in the document 135. We call this API as API (a) for brevity in this discussion.

The client device 110 is built to communicate with any server that supports API (a). When developing the client, a programmer fetches the API definition document from the network address (a) (FIG. 1, step I), and the computer 130 will return a copy of the document 135 (FIG. 1, step II). The programmer then builds the client program that is able to send communication actions to a server in accordance with the communication methods described in the document 135. The API identifier (a) is also included in the client program to be used in the API detection process.

The server device 120 is built to support API (a), which means that the server will accept requests and produce responses in accordance with the API definition document 135. When developing the server, a programmer fetches the API definition document from the network address (a) (FIG. 1, step III), and the API definition document 135 is returned from the computer 130 (FIG. 1, step IV). The programmer then builds the server program based on the API definition. The API identifier (a) is also included in the server program to be used in the API detection process.

It should be noted that the API definition document used in this invention needs not contain the program code that is capable of carrying out the defined communication actions. Different client devices may have different programs written in different programming languages to implement the communication actions in accordance with the API definition document. Similarly, programs in different server devices may also be written in different programming languages to communicate with clients in accordance with the API definition document.

At runtime, the program on server 120 starts listening to network requests. The client device 110 received the network address of the server 120 from sources such as user inputs, configuration files, or from communicating with another server. The client then intends to communicate with the server 120. Since the client 110 has never communicated with the server 120 before, the client 110 needs to detect the APIs of the server 120, and to resolve whether API (a) that the client understands is one of the APIs supported by the server. Accordingly, the client 110 sends an API inquiry request to the server 120 (FIG. 1, step V), and the server returns a server specification document 125 (FIG. 1, step VI). It should be noted that the mechanism for sending the API inquiry request depends on the network protocol between the client 110 and the server 120. For example, the server 120 may be a web server using HTTP protocol, and the server's HTTP URL location is given to the client 110. In such case, the API inquiry request sent from the client 110 is just a standard HTTP GET request sent to the server's URL location, and the server will return the document 125 in an HTTP response message.

A server specification document contains a list of API identifiers corresponding to the APIs which the server supports, and optionally a list of communication action definitions specific to the server that are not part of the listed APIs. A server may support a number of APIs, and their API identifiers are listed in the server's specification document. The server specification document may be created during the development of the server, or be generated at runtime by the server program from the list of API identifiers that the server supports.

In this embodiment, the specification document 125 contains the API identifier (a). Once the client 110 obtained the document 125, the client 110 compares the API identifiers listed in the document 125 with the API identifier (a). If the identifier (a) matches an API identifier listed in the document 125, the client 110 concludes that the client may communicate with the server 120 by using methods described in API (a). For example, if the API (a) contains the definition of a remote function, the client device 110 may call the remote function on the server 120. It should be noted that a client may be built to support multiple APIs, and will determine whether each API is supported by a server, then select the supported APIs to communicate with the server accordingly.

The significance of this API detection method lies in that the client 110 does not need to have the knowledge of the information pertaining to the server 120 built into the client program to correctly detect the server's APIs. By recognizing the API identifier (a) from the server specification document 125 at runtime, the client 110 has great confidence that the server 120 supports the same API definition as that understood by the client, because the API identifier (a) explicitly points to the API's definition document 135. This allows the client and the server to be independently developed by different developers who share little information between them, and yet their products may communicate with each other correctly.

It should be noted that the host computer 130 may be operated by a third-party that is different from the developers of the client or the server. Accordingly, neither developers of the client or the server can alter the definition of API (a), since only the one who operates the computer 130 has the right to modify the API's definition document 135. In other words, only the operator of the host computer 130 has the authority over the API (a)'s definition. This ensures the consistency of the overall system in that no one else may give API (a) a different definition.

Nonetheless, the operator of the computer 130 may still make change to the document 135 and therefore alter the definition of the API (a), perhaps to add new functions or to fix problems. A device built with an old version of the API (a) will not be able to correctly communicate with devices built with the latest version of the API. In light of this, the program in a device may fetch the API definition document 135 periodically at runtime and compare it to the version used when the program was built to detect changes in the API (a)'s definition. Here, the client device 110 and the server device 120 can each periodically fetch the document 135 at runtime and perform the aforementioned comparison to ensure that the API (a) understood by the device is consistent with the current definition of API (a), or trigger actions to deal with the changes, such as notifying the developer. In any case, there will be no confusion as to what the latest definition of API (a) is, since the latest version is always the document 135 currently available on the computer 130.

It should also be noted that devices in the distributed system 100 may be interconnected by homogeneous as well as heterogeneous networks. That is, the client 110, the server 120, and the host computer 130 need not be interconnected with the same network technology. For example, the client 110 may use the Bluetooth technology to communicate with the server 120, whereas the computer 130 is on the Internet accessible through the TCP/IP protocol. The client 110 may obtain the server specification document 125 over a Bluetooth connection, whereas the API definition document 135 is fetched through HTTP over a TCP/IP connection. Each API identifier listed in a server specification document may reference the network address in a different networking technology. Similarly, each parent API identifier listed in an extended API definition document may also reference the network address in a different networking technology.

Figure 2:
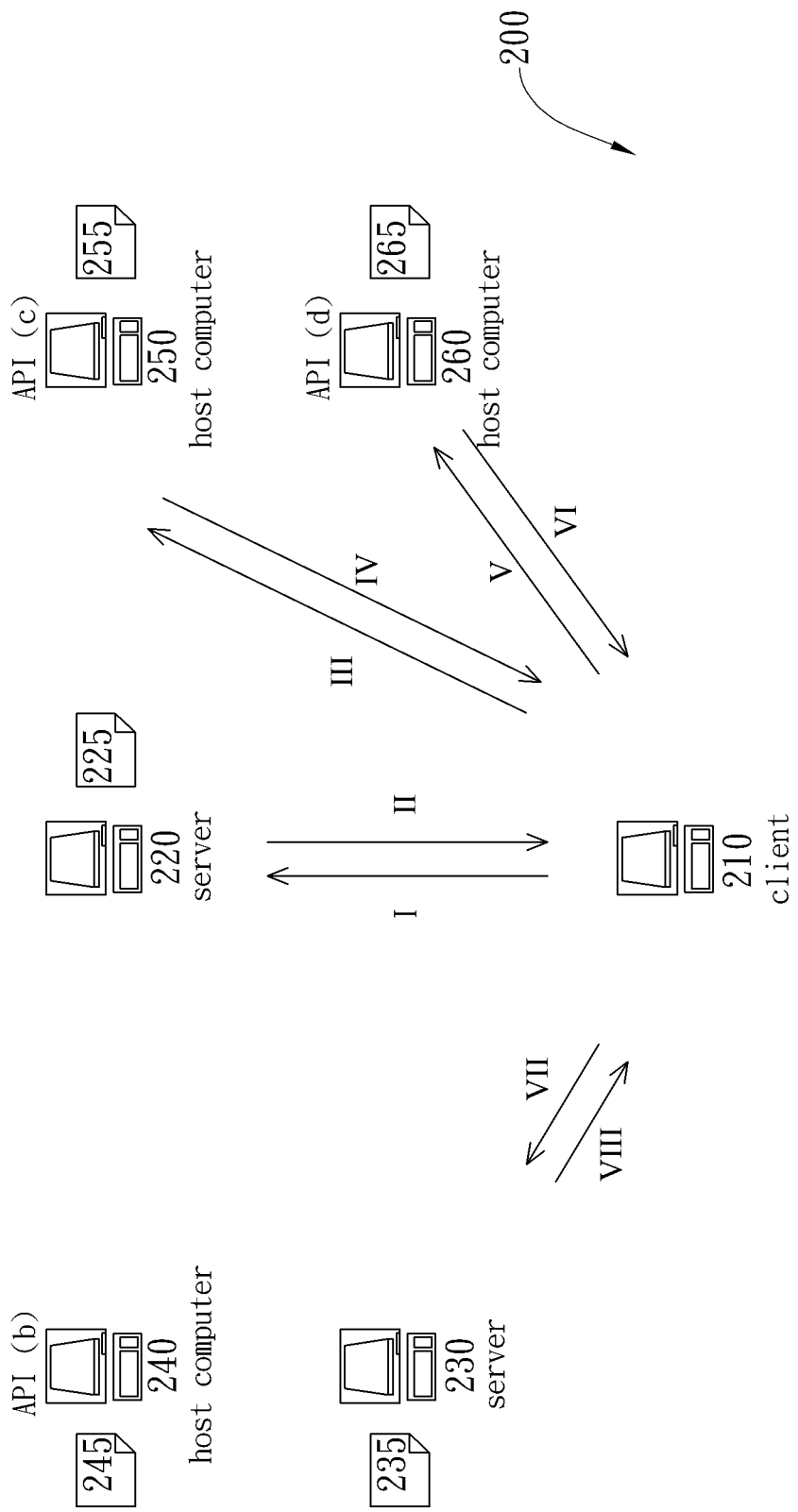
FIG. 2 shows a distributed system wherein the client determines the support of an API on the server in accordance with the second embodiment of the invention.

FIG. 2 illustrates the second embodiment of this invention. In a distributed system 200, a client electronic device 210 intends to communicate with server electronic devices 220 and 230, using methods described in the API definition document 245. API definition documents 245, 255, and 265 are reposited in the host computers 240, 250, and 260 respectively in the distributed system 200; the documents can be obtained from the network addresses (b), (c), and (d) respectively in the distributed system 200; (b), (c), and (d) are also used as the API identifiers to represent the API definitions described in the documents 245, 255, and 265 respectively in the distributed system 200. We call these APIs as API (b), API (c) and API (d) for brevity.

The client device 210 is built to communicate with any server that supports the API (b). At runtime, the client device receives the network address of the server 220 from sources such as user inputs, configuration files, or from communicating with another server. The client then intends to communicate with the server 220. The client 210 needs to detect the APIs of the server 220, and to resolve whether API (b) that the client understands is one of the APIs supported by the server 220. Accordingly, the client 210 sends an API inquiry request to the server 220 (FIG. 2, step I), and the server returns the server specification document 225 (FIG. 2, step II), which contains a list of API identifiers (c) and (d). Since neither identifier (c) nor (d) matches the API identifier (b) understood by the client 210, the client needs to further investigate whether API (c) or API (d) is extended from API (b) and therefore is compatible with API (b).

One API may be extended from a second API by adding extra features, such as a list of extra function names with their respective input and output data types that may be called on the server, a list of extra properties that may be read from or write to the server, and a list of extra special data type definitions that may be used in the communication, and so on; the first API is called an extended API, and the second API is called the parent API of the extended API. An extended API may be extended from a number of parent APIs. A server supports an extended API may be communicated with extra features defined in the API, as well as all actions defined in the API's parent APIs. The purpose of an extended API is to allow a server to support the extra features in the API while still being compatible with client devices that only understand the extended API's parent APIs. For example, an old API may allow a client device to search music albums on a server device by album titles, whereas a new extended API may extend the old API and add a search by artist name feature; clients that understand the new extended API will be able to search by album titles and artist names, whereas clients that understand only the old API can still search by album titles.

The API definition document of the extended API contains a list of network addresses, each of which is the API identifier of a parent API, along with the definitions of extra communication actions, such as a list of function names with their respective input and output data types that may be called on the server, a list of properties that may be read from or write to the server, and a list of special data type definitions that may be used in the communication, and so on. It should be noted that the API extension relationship may extend beyond one level, in that one API is extended from a parent API, which in turn is extended from yet another parent API, and so on. All APIs that an extended API directly or indirectly extended from are called the parent APIs of the extended API.

In this embodiment, the client 210 needs to determine whether API (c) or API (d) is extended from the API (b) understood by the client. To investigate API (c), the client 210 sends a request to the network address (c) (FIG. 2, step III) to fetch the API definition document 255 from the host computer 250 (FIG. 2, step IV). Here, the API definition in the document 255 does not list API (b) as a parent API. Therefore the client 210 determines that API (c) is not extended from API (b). Subsequently, the client 210 investigates API (d) by sending a request to the network address (d) (FIG. 2, step V) to fetch the API definition document 265 from the host computer 260 (FIG. 2, step VI). In this embodiment, the document 265 lists the API identifier (b) as a parent API. Therefore the client 210 determines that API (d) is extended from API (b). Accordingly, the client 210 concludes that it may communicate with the server 220 in accordance with API (b), since the server 220 supports API (d) and API (d) is an extension to API (b). The client 210 may choose to store the documents 255 and 265 in the device for a period of time, so that the client does not need to obtain them again when the definition of API (c) or (d) is needed later.

It should be noted that the definition document of an API and all its parent APIs may be reposited on different host computers controlled by different parties. In this embodiment, API (b) and (d) are reposited on host computers 240 and 260 respectively, and each computer may be controlled by a different party. Accordingly, even though the party controlling the computer 260 has the authority over the definition of API (d), the party has no authority over the definition of its parent API (b). That is, even though the party may modify the document 265 to alter the definition of API (d), such as modifying communication actions pertaining to the API (d) or even removing the API identifier (b) from the list of its parent APIs, in no way the document 265 will affect the definition of API (b), which is defined in the document 245. This is a clear benefit of using the network address where an API definition document can be obtained to identify the API, because the API's definition remains consistent throughout the distributed system regardless of where it is referenced.

In this embodiment, the client 210 also receives the network address of the server 230 and intends to communicate with the server 230. The client 210 sends an API inquiry request to the server 230 (FIG. 2, step VII), and the server returns a server specification document 235 (FIG. 2, step VIII), which contains the API identifier (c). To determine whether API (c) is extended from API (b), the client 210 may use the API definition document 255 already reposited in the client device after detecting the APIs of server 220, or fetch another copy of the document 255 again from the network address (c). Either way, the client 210 will know that the API identifier (b) is not listed as a parent API of API (c) in document 255. Since API (c) is the only API supported by the server 230, the client concludes that it may not communicate with the server 230 in accordance with API (b).

In the first two embodiments of the present invention, before communicating with a server device, if a client lacks the information of the APIs supported by the server, the client needs to send an API inquiry request to the server to detect the server's APIs. This may be time consuming if there are many servers the client needs to investigate. Therefore, in the third embodiment of the present invention, another method related to determining the support of an API on a server is broached.

Figure 3:
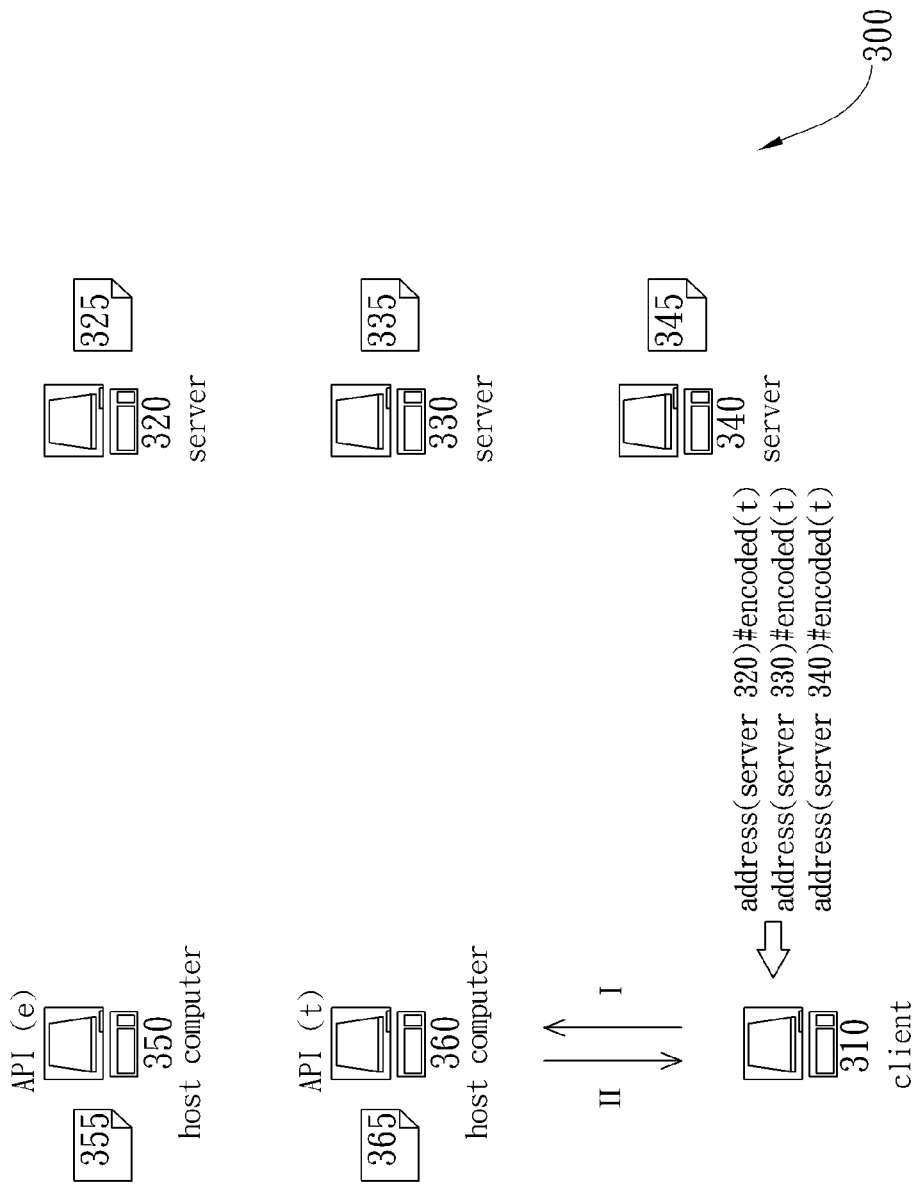
FIG. 3 shows a distributed system wherein the client determines the support of an API on the server in accordance with the third embodiment of the invention.

FIG. 3 illustrates the third embodiment of this invention. In a distributed system 300, a client electronic device 310 intends to communicate with server electronic devices 320, 330, and 340 using methods described in the API definition document 355. API definition document 355 and 365 are reposited in the host computer 350 and 360 respectively in the distributed system 300; the documents can be obtained from the network address (e) and (f) respectively in the distributed system 300; (e) and (f) are also the API identifiers to represent the API definition described in the document 355 and 365 respectively in the distributed system 300. We call these APIs as API (e), API (t) and API (d) for brevity.

The client device 310 is built to communicate with any server that supports the API definition 355, which is identified by the API identifier (e). At runtime, the client device receives the address information of the server 320, 330, and 340 from sources such as user inputs, configuration files, or from communicating with another server. The client then intends to communicate with the servers. In this embodiment, the address information received by the client are in a compound format, wherein every compound address includes the network address of the server and a list of API identifiers of the APIs that the sever supports. In this embodiment, address (server 320) # encoded(t), address(server 330) # encoded(t), and address(server 340) # encoded(t) are three such compound addresses. In every compound address, the portion before the symbol '#' is the network address of the server, and the portion after the symbol '#' is an encoded string of the API identifiers that the server supports. It should be noted that different compound address formats may be used in the client device, and the format selection is subject to the support of the client program, as well as the network address format used in the system. For example, in a system wherein the server address and the address (t) are all HTTP URLs, the compound address may be constructed by concatenating the server's URL, the symbol '#', and an encoded string of URL (t) using the standard percent-encoding mechanism defined in the URI specification.

In the event that the client device 310 intends to communicate with the server identified by the compound address address(server 320) # encoded(t), the client decodes the compound address into the network address of server 320 and the API identifier (t). Accordingly, the client 310 knows that the server supports API (t). Since the client 320 does not recognize the API identifier (t), the client sends an API inquiry request to the network address (t) (FIG. 3, step I) to fetch the API definition document 365 from the host computer 360 (FIG. 3, step II). In this embodiment, the document 365 lists the API identifier (e) as a parent API of API (t). The client therefore concludes that it may communicate with the server 320 using API (e), since the server supports API (t) which is extended from API (e).

Subsequently, when the client 310 decodes the compound address address(server 330) # encoded(t) and address(server 340) # encoded(t), the client knows that it may also communicate with server 330 and server 340 using API (e), since their compound addresses indicate that both servers support API (t). With this method, the client 310 is able to resolve its API compatibility with the server 320, 330, and 340 without obtaining the server definition document 325, 335, and 345 from each server respectively; therefore, efficiency is enhanced.

Figure 4:
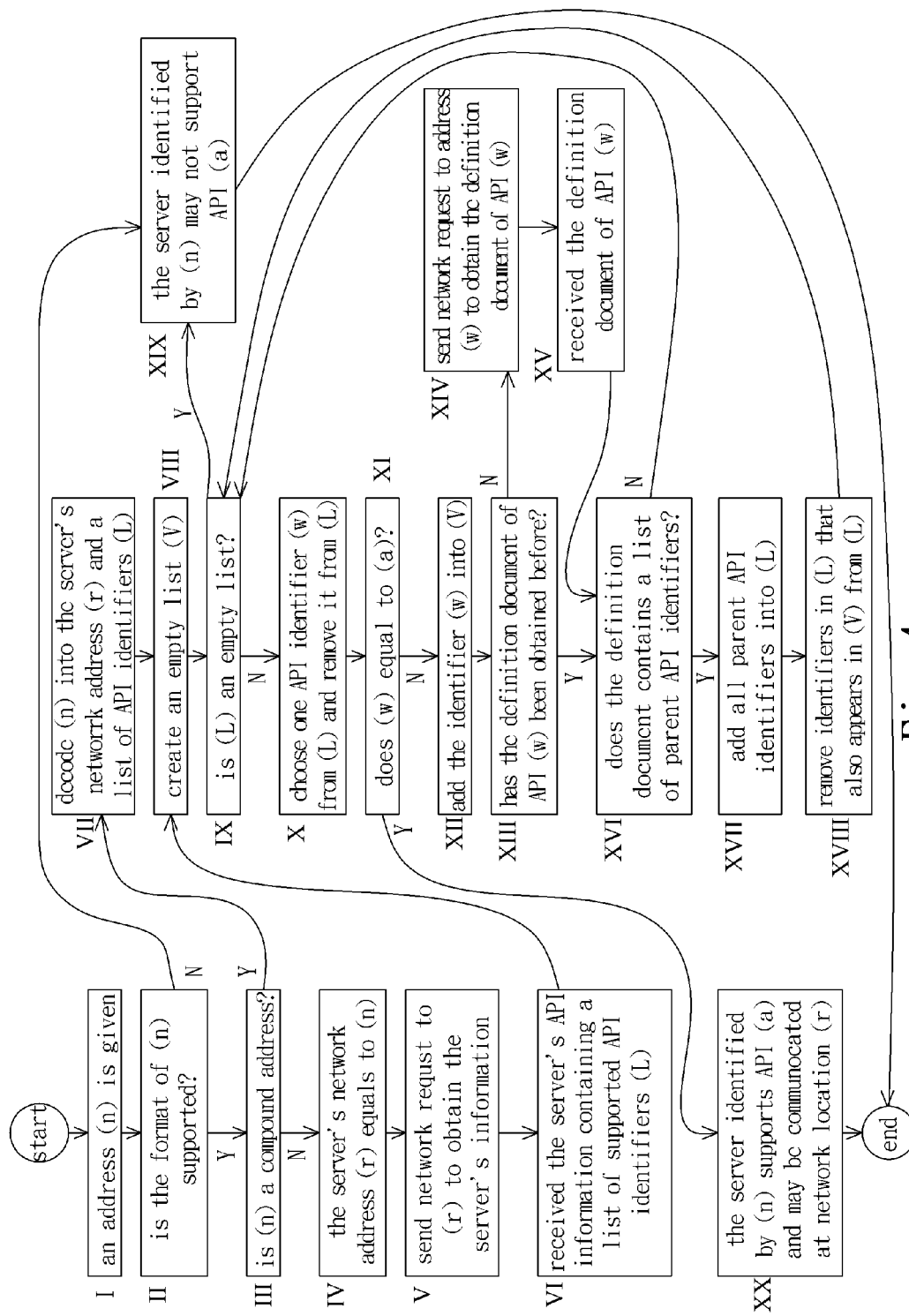
FIG. 4 is a flow chart that shows the procedure to determine the support of an API on the server by the method of this invention.

FIG. 4 shows the procedure to determine whether a server identified by an address (n) may be communicated in accordance with an API (a) by all the methods given in the above embodiments. The procedure begins when an address (n) is given (FIG. 4, step I). If the address format is not supported (FIG. 4, step II), the procedure will conclude that the server identified by (n) may not support API (a) and should not be communicated in accordance with API (a) (FIG. 4, step XIX). If the address format is supported, the address will be analyzed to see if it is a compound address (FIG. 4, step III). If it is not a compound address, the address (n) is the network address (r) of the server (FIG. 4, step IV). A network request will then be sent to (r) to obtain the server's API information (FIG. 4, step V), which contains a list of API identifiers (L) (FIG. 4, step VI). Conversely, if the address (n) is a compound address, (n) will be decoded into the server's network address (r) and a list of API identifiers (L) (FIG. 4, step VII). Either way, (L) will contain a list of API identifiers supported by the server identified by the address (n). An empty list (V) is then created to store the identifiers that have been analyzed in the procedure (FIG. 4, step VIII).

The API identifiers in (L) are analyzed as follows. An API identifier (w) in (L) is chosen and removed from (L) (FIG. 4, step X). If the chosen identifier (w) equals (a), the procedure ends immediately and concludes that the server identified by (n) supports API (a), and the server may be communicated at network location (r) (FIG. 4, step XX). If the chosen identifier (w) is not equal to (a), (w) will first be added to the list (V) (FIG. 4, step XII) and then examined whether the definition document of API (w) has been obtained before (FIG. 4, step XIII). If it has not been obtained before, a network request will be sent to network location (w) (FIG. 4, step XIV), and the definition document of API (w) will be received in the response message (FIG. 4, step XV). If the definition document contains a list of API identifiers representing the parent APIs from which API (w) is extended (FIG. 4, step XVI), all these parent API identifiers are added to (L) (FIG. 4, step XVII). (L) is then examined to remove any API identifier in (L) that also exists in (V) (FIG. 4, step XVIII). The steps (IX) to (XVIII) are repeated until either one API identifier in (L) matches (a), or (L) becomes empty and still no identifier matches (a). In the latter case, the procedure ends with the conclusion that the server identified by address (n) may not support API (a) (FIG. 4, step XIX).

In the first three embodiments of the present invention, the network address of a server is given to the client device through means not controlled by the client device, such as user inputs or configuration files. In the forth embodiment of the present invention, a method to automatically discover the network address of a server that supports an API is broached.

Figure 5:
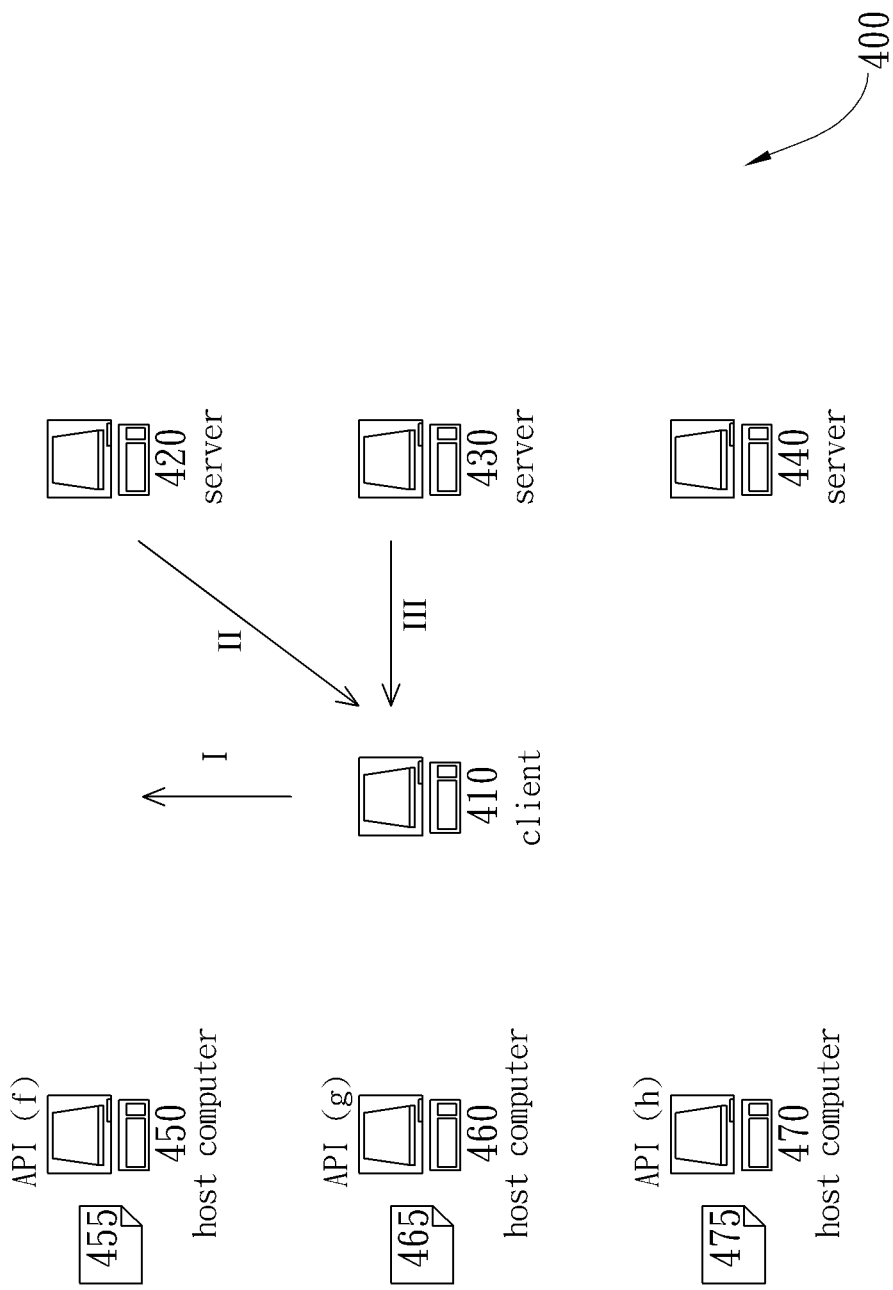
FIG. 5 shows a distributed system wherein the client discovers servers that support an API in accordance with the forth embodiment of the invention.

FIG. 5 illustrates the forth embodiment of this invention. In a distributed system 400, a client electronic device 410 intends to discover the network addresses of server electronic devices in the system that can be communicated with methods described in the API definition document 455. API definition document 455, 465, and 475 are reposited in the host computer 450, 460, and 470 respectively in the distributed system 400; the documents can be obtained from the network address (f), (g), and (h) respectively in the distributed system 400; (f), (g), and (h) are also the API identifiers to represent the API definition described in the document 455, 465, and 475 respectively in the distributed system 400. We call these APIs as API (f), API (g) and API (h) for brevity.

The client device 410 is built to communicate with any server that supports the API (f). To discover servers in the system 400 that supports API (f), the client 410 sends a broadcast request message to all servers in the network (FIG. 5, step I), wherein the broadcast message contains the API identifier (f) and the network address of the client 410. The broadcast message requests all servers in the network that support API (f) to report their network addresses to the client 410. It should be noted that the mechanism to send out the broadcast message depends on the type of network used in the system 400.

A server device that allows its existence to be automatically discovered has program code constantly listening to broadcast messages in the network. In this embodiment, server device 420, 430, and 440 are all listening to broadcast messages. The server 420 supports API (f); therefore upon receiving the broadcast request message sent from the client 410 looking for servers that support API (f), the server 420 sends a response message containing the network address of server 420 to the client (FIG. 5, step II). The server 430 supports API (g), which is an extended API of API (f). Upon receiving the broadcast request message sent from the client 410, the server 430 knows that even though the server supports API (g), it can still be communicated with the requested API (f) from which API (g) is extended, so the server 430 sends a response message containing the network address of server 430 to the client (FIG. 5, step III). The server 440 supports API (h), which is not an extension to the API (f). Accordingly, the server 440 makes no response upon receiving the broadcast message from the client 410. After receiving the response messages sent by the server 420 and 430, the client 410 obtained the network addresses of server 420 and 430, and the discovery process is completed. The client may then communicate with server 420 and 430 in accordance with API (f).

It should be noted that the broadcast request message sent by a client device may contain more than one API, and Boolean conditions may be used to express the requirement of the request. For example, the broadcast request message sent to the network of the system 400 may request servers that support either API (g) or API (h) to respond, or request servers that support both API (g) and API (h) to respond. In the former case, both server 430 and 440 will respond, while in the latter case, no server will respond as none of them support both API (b) and API (h).

It should also be noted that the network used for discovering servers does not need to be the same as that used for repositing API definitions. For example, the client 410, and the servers 420, 430, and 440 may be interconnected by the IEEE 1394 bus, whereas the host computers 450, 460, and 470 are on the Internet reachable through the TCP/IP protocol. In such case, the steps I, II, and III discussed in this embodiment are performed within the IEEE 1394 bus, whereas the client and the servers may each fetch API definition documents over the Internet.

By the methods and systems demonstrated in the embodiments of the present invention, a client device can easily detect and resolve application programming interfaces of a server device based on the information obtained through the API detection process. More importantly, the consensus of API definitions between the client and the server can be established, because the identifier used to identify an API clearly points to the API's definition document. With the ability to establish the consensus on APIs, the client device, the server device, and the API definitions can each be developed by a different party, and yet the devices can still be incorporated into a system and communicate with each other correctly. As a result, the method suits well to large-scale distributed systems wherein many independent parties are involved.

What is claimed is:

1. A method for detecting and resolving application programming interfaces (APIs) of a server in a distributed system, comprising:
   requesting, by a client, services from a server for the APIs for which the server provides services;
   receiving, by the client, a response from the server that includes a list containing identifiers of the APIs for which the server provides services, wherein each of the identifiers contains a network address from which a corresponding API definition document can be obtained, the APIs being used by the client for communicating with the server;
   extending at least one parent API with extra features to an extended API; and
   listing the extra features and the identifiers of the parent APIs in the definition document of the extended API, wherein each of the identifiers contains the network address from which the corresponding parent API definition document can be obtained.

2. The method as recited in claim 1, wherein the program in the client or a program in the server is configured to:
   fetch the API definition document from the network address pointed to by the identifier of one API for which the program provides services; and
   compare the fetched API definition document to the corresponding API definition document used when the program was built to detect changes in the API definition.

3. The method as recited in claim 1, further comprising:
   selecting by the client one identifier corresponding to one API understood by the client from:
   (a) identifiers in the list provided by the server; or
   (b) identifiers of parent APIs of an extended API whose identifier is in the list provided by the server; and
   communicating with the server by the client in accordance with the API definition document corresponding to the selected identifier.

4. A method for detecting and resolving application programming interfaces (APIs) of a server in a distributed system, comprising:
   receiving by a client a compound address of a server providing services, wherein the compound address is encoded with:
   (a) a network address of the server; and
   (b) a list containing the identifiers of the APIs for which the server provides services, wherein each of the identifiers contains a network address from which a corresponding API definition document can be obtained; and
   decoding by the client the compound address into the network address of the server and a list of the identifiers of the APIs supported by the server, the APIs being used by the client for communicating with the server;
   extending at least one parent API with extra features to an extended API; and
   listing the extra features and the identifiers of the parent APIs in the definition document of the extended API, wherein each of the identifiers contains the network address from which the corresponding parent API definition document can be obtained.

5. The method as recited in claim 4, further comprising:
   selecting by the client one identifier corresponding to one API understood by the client from:
   (c) identifiers in the list decoded; or
   (d) identifiers of parent APIs of an extended API whose identifier is in the list decoded; and
   communicating with the server by the client in accordance with the API definition document corresponding to the selected identifier.

6. An automatic API-detecting-and-resolving-enabled distributed system, comprising:
   a server electronic device connected to at least one network and having a computer program stored therein to configure the server electronic device to provide services by:
   receiving a request, the request inquiring about at least one API for which the server electronic device provides services;
   responding to the request by providing a list containing the identifiers of the APIs for which the server electronic device provides services, each of the identifiers containing a network address from which a corresponding API definition document can be obtained; and communicate in accordance with the API definition documents to which the identifiers included in the list correspond; and a group of host computers wherein each host computer provides API definition documents to be fetched at the network addresses pointed to by:

(a) a number of identifiers in the list provided by the server; and/or (b) a number of identifiers of parent APIs of an extended API whose identifier is in the list provided by the server.

7. A system as recited in claim 6, further comprising:

a client electronic device connected to at least one network and having a computer program stored therein to configure the client electronic device to:

request the server electronic device to inquire about the APIs for which the server electronic device provides services;

select one identifier corresponding to one API understood by the client electronic device from:

(c) identifiers in the list provided by the server electronic device in response to the request; or (d) identifiers of parent APIs of an extended API whose identifier is in the list provided by the server electronic device in response to the request; and communicate with the server electronic device in accordance with the API definition document to which the selected identifier corresponds.

8. A system as recited in claim 7, wherein the networks interconnecting the client electronic device, the server electronic device, and the host computers are homogeneous or heterogeneous.

9. A system as recited in claim 6, further comprising:

a client electronic device connected to at least one network and having a computer program stored therein to configure the client electronic device to:

receive a compound address of the server electronic device, wherein the compound address is encoded with:

(e) the network address of the server electronic device; and (f) a list containing the identifiers of the APIs for which the server electronic device provides services, wherein each of the identifiers contains the network address from which the corresponding API definition document can be obtained;

decode the compound address into the network address of the corresponding server electronic device and a list of the identifiers of the APIs for which the server electronic device provides services;

select one identifier corresponding to one API understood by the client electronic device from:

(g) identifiers in the list decoded; or (h) identifiers of parent APIs of an extended API whose identifier is in the list decoded; and communicate with the server electronic device in accordance with the API definition documents to which the selected identifier corresponds.

10. A system as recited in claim 9, wherein the networks interconnecting the client electronic device, the server electronic device, and the host computers are homogeneous or heterogeneous.

11. A method for discovering an API for which a number of servers that provide services in a distributed system, comprising:

requesting, by a client, an identifier of at least one API from the number of servers providing services for the APIs, the identifier containing a network address from which the corresponding API definition document can be obtained, the APIs being used for communicating with the server;

receiving, by the client, response messages from the number of servers that provides services for the APIs, each response message containing the network address of the responding server;

extending at least one parent API with extra features to an extended API; and listing the extra features and the identifiers of the parent APIs in the definition document of the extended API, wherein each of the identifiers contains the network address from which the corresponding parent API definition document can be obtained.

12. A method as recited in claim 11, further comprising:

receiving, by the client, response messages from the number of servers that provides services for at least one extended API that is extended from the requested API, each response message containing the network address of the responding server.

13. An automatic server-discovering-enabled distributed system, comprising:

a server electronic device connected to at least one network and having a computer program stored therein to configure the server electronic device to provide services by:

receiving a request with the identifier of one specific API, wherein the identifier contains a network address from which a specific API definition document can be obtained, the specific API being used for communicating with the server; and responding to the request with the network address of the server electronic device if the server electronic device can be communicated with in accordance with the API definition document corresponding to the identifier in the request; and a group of host computers wherein each host computer provides API definition documents to be fetched at the network addresses pointed to by:

(a) the identifier in the request and/or (b) a number of identifiers of parent APIs of an extended API whose identifier is in the request.

14. A system as recited in claim 13, further comprising:

a client electronic device connected to at least one network and having a computer program stored therein to configure the client electronic device to:

request the number of server electronic devices with the identifier of one API, wherein the identifier contains the network address from which the API definition document can be obtained; and receive a number of responses wherein each response contains the network address of a server electronic device that can be communicated with in accordance with the API definition document corresponding to the identifier in the request.

15. A system as recited in claim 14, wherein the networks interconnecting the client electronic device, the server electronic device, and the host computers are homogeneous or heterogeneous.

* * * * *